N. P. HARSHBERGER

COMPOSITION SHINGLE

Dec. 20, 1932.

Re. 18,698

Original Filed Aug. 28, 1926

INVENTOR

Norman P. Harshberger

By. E. J. Andrews

Atty.

Reissued Dec. 20, 1932 Re. 18,698

UNITED STATES PATENT OFFICE

NORMAN P. HARSHBERGER, OF SCARSDALE, NEW YORK

COMPOSITION SHINGLE

Original No. 1,717,603, dated June 18, 1929, Serial No. 132,121, filed August 28, 1926. Application for reissue filed June 29, 1931. Serial No. 547,758.

This invention relates to composition shingles and has for its object providing a shingle the lap portion of which is locked down by other shingles, and one which can be conveniently cut from sheets of shingle material without waste. A further object of the invention is to provide such shingles which present a novel and pleasing appearance on the roof when assembled.

A still further object of the invention is to provide shingles having body portions which may be locked in one position or in other positions which may be attached to a roof without locking each shingle to an adjacent shingle. It is also an object of the invention to provide a shingle which is reversible and one with which the amount of head lap can be varied within a considerable range.

Figure 1:
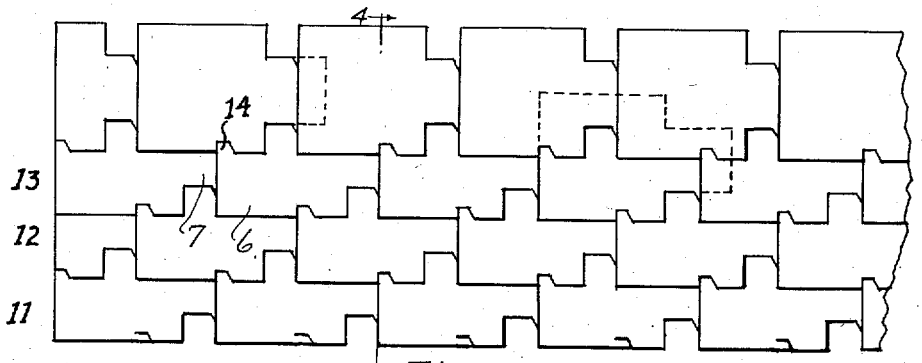
Figure 2:
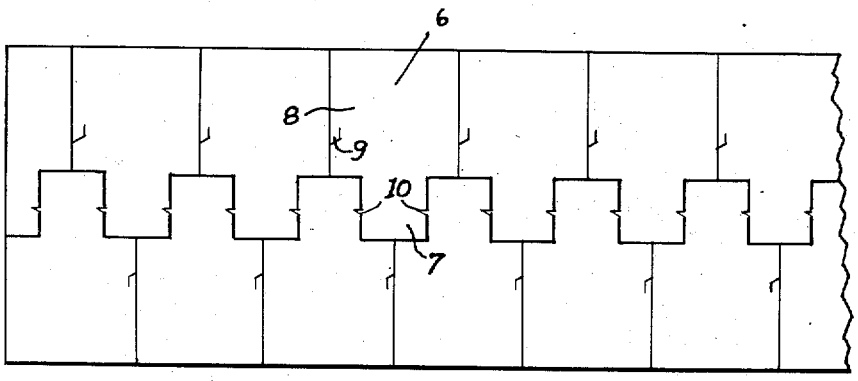
Figure 3:
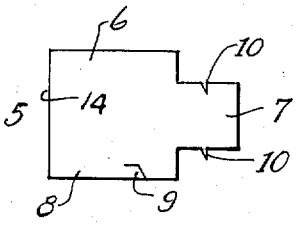
Figure 4:
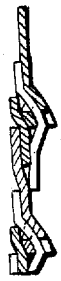

Of the accompanying drawing Fig. 1 is a plan view of the shingles which embody the features of my invention, as they appear when assembled on the roof; Fig. 2 is a plan view of a sheet of shingle material showing how the shingles are cut therefrom; Fig. 3 is a plan view of a single shingle; and Fig. 4 is a sectional view along the line 4—4 of Fig. 1.

The shingles 5 comprise a body portion 6, an extension or a shank portion 7, and a lap portion 8. Formed in the lap portion is a locking lug 9 and formed in the shank portions are aligning notches or fingers or guides 10. When the shingles are assembled on the roof they are laid in rows 11, 12 and 13, with the shank 7 of the left-hand shingle passing under the body portion 6 of the right-hand shingle of the same row; and with the guides 10 of the shank aligned with the lapping edge of the overlying shingle of the same row.

Each of the shingles has a lap portion 8 which is locked down by passing the lug 9 of the lap under the left hand end of the underlying shingle in the adjacent row of shingles. The lefthand ends of the shingles overlap and hold down the right-hand ends of the shingles of the same row; and the underlying shingles of one row hold down the lower edges of the shingles of the adjacent overlapping row, by means of the lug 9, which is fixed to the overlying shingles. The provision of the tab 9 is of far reaching importance in a shingle of this design inasmuch as such shingles are designed for wide spacing so that relatively lengthy portions exist which at their lower edges are susceptible of being lifted in a driving rain or wind storm. In order to avoid any trouble from this source I have provided tabs on the body portions of the shingles which interlock with the edges of the subjacent shingle so that any lifting whatever is effectively prevented.

When the shingles are assembled on a roof, it will be seen that a space occurs between the body portions of adjacent shingles, this space being caused by the difference in width between the extension 7 and the body portion 6. At first two spaces are formed, but as the shingles are laid up the roof the upper space is covered over, thus leaving only one space showing, as illustrated in course 12 or 13 of Fig. 1. In the event that the shingle is reversed, the locking lug 9 is not made use of and the amount of lap between adjacent shingles of the same row can be varied and in some instances dispensed with completely. For instance, the right-hand edge of the extension 7 may abut an edge 5 of the body portion of an adjacent shingle, if it is desired to lay the shingles in a more economical manner.

It will be seen that, as the shingles are cut from the sheet and then laid on the roof, one half of the shanks will have the fingers and recesses 10 extending upwardly, and the other half will have them extending downwardly. But obviously this is immaterial as they are merely guides for aligning the shingles, in each row, with each other. The shingles are positioned with reference to the shingles of the adjacent rows by the position of the lugs 9, and the ends 14. In this manner the shingles are quickly and accurately positioned and are also so interlocked as to prevent warping, or bending up otherwise, of the lap portions thereof. Obviously also the shingles may be cut with the lugs 9 on the opposite side of the body portion so that the shank 7 may be extended towards the left instead of towards the right.

From the foregoing description it will be seen that I have provided a shingle which may be cut from a strip of material with great facility and without waste. It will also be noted that the shingle may be locked to an adjacent shingle, and yet such locking action in no way interferes with another very desirable feature, which is that of ability to vary the head lap within wide limits. A further advantage will be seen in that the shingle of my invention may be laid in locked relation or unlocked relation and that if necessary no overlapping is required of adjacent shingles in the same horizontal course. A still further advantage will be noted in the pleasing appearance which is brought about by manufacturing my improved shingle out of less material than that normally used. This will be seen to be true when my shingles are compared with conventional rectangular shingles which cover no more roof but which do require more material, and in the end such conventional shingles fail to impart a pleasing appearance such as that I have shown.

I claim as my invention:—

1. An assembly of shingles comprising individual shingles spaced apart at their lowermost edges, one of said shingles having extensions lying below an adjacent shingle in the same course, said extension serving as a support for a shingle in the next overlying course.

2. A rectangularly-shaped shingle, a rectangularly-shaped shank projecting from the central portion of one edge of the shingle, and a lug fixed to an adjacent edge of the shingle, the outer edge of the lug being in line with the associated edge of the shingle, the width of said shank being substantially one-half the length of the side from which it projects.

3. A rectangularly-shaped shingle, a rectangularly-shaped shank projecting from the central portion of one edge of the shingle, and a lug fixed to an adjacent edge of the shingle, the outer edge of the lug being in line with the associated edge of the shingle.

4. A shingle according to claim 3 in which the width of said shank is one-half the length of the side from which it projects.

5. A substantially square-shaped shingle, a substantially square-shaped shank projecting from the central portion of one edge of said shingle, the area of the shank being substantially one-fourth of the area of the remainder of the shingle, and a slit projecting inwardly and angularly from the adjacent edge of the shingle.

6. In a shingle assembly, shingles having body portions and extensions narrower than the depth of said body portions, said extensions on one shingle lapping a portion of the body portion of a shingle in the same course, there being wide spaces between the lowermost weather edges of adjacent shingles.

7. In a shingle assembly, a shingle having a body portion and a narrow tab portion extending from one side edge thereof, and similar shingles in the same course of said assembly, there being wide spaces between the body portions of said shingles above and below the transverse median line of such courses.

8. In a shingle assembly, a shingle with a body portion and an extension, said extension lapping a portion of the body portion of a second shingle in the same course, the body portion of said second shingle overlapping said extension and creating a space between said body portions.

9. In a shingle assembly, a shingle with a body portion and an extension, said extension lapping a portion of the body portion of a second shingle in the same course, the body portion of said second shingle lapping said extension and creating a space between said body portions, said body portions having an interlocking tab attached thereto.

10. In a shingle assembly, a shingle with a body portion and an extension, said extension lapping a portion of the body portion of a second shingle in the same course, the body portion of said second shingle lapping said extension and creating a space between said body portions.

Signed June 18, 1931.

NORMAN P. HARSHBERGER.